United States Patent [19] [11] 4,028,801
Gelfman [45] June 14, 1977

[54] HAND-HELD GLASS CUTTER

[76] Inventor: Ephrem J. Gelfman, R.F.D. No. 1, Sparta, Wis. 54656

[22] Filed: Apr. 12, 1976

[21] Appl. No.: 675,545

[52] U.S. Cl. .......................................... 30/164.95
[51] Int. Cl.² ...................................... B26B 25/00
[58] Field of Search .......... 30/164.95, 164.9, 292; 33/32 B

[56] References Cited

UNITED STATES PATENTS

| | | | |
|---|---|---|---|
| 911,342 | 2/1909 | Stebbins | 30/164.95 |
| 2,155,802 | 4/1939 | Resh | 33/32 B |
| 2,176,733 | 10/1939 | Fanning | 33/41 |
| 2,507,779 | 5/1950 | Gault | 30/164.95 |
| 2,635,334 | 4/1953 | Tvrzicky | 30/169 |
| 2,685,764 | 8/1954 | Hatfield | 30/164.95 |
| 2,782,501 | 2/1957 | Adams | 30/164.9 |
| 2,981,002 | 4/1961 | Adams | 33/32 |
| 3,074,395 | 1/1963 | Kevorkian | 30/365 X |
| 3,138,868 | 6/1964 | Kuthroff | 30/164.95 |
| 3,373,488 | 3/1968 | Fletcher | 30/164.95 |
| 3,812,748 | 5/1974 | Nausbaum | 30/164.95 X |

Primary Examiner—Al Lawrence Smith
Assistant Examiner—J. C. Peters
Attorney, Agent, or Firm—John E. Reilly

[57] ABSTRACT

A hand-held glass cutter establishes three-point contact with the work surface in such a way as to permit steady, accurate advancement along straight or curved surfaces, and a guide member is provided in cooperation with the cutter to guide it along a predetermined path of travel.

9 Claims, 8 Drawing Figures

HAND-HELD GLASS CUTTER

BACKGROUND OF THE INVENTION

This invention generally relates to hand-held glass cutters and more particularly to support means associated therewith, said support means being adapted to lend greater stability in cutting along a straight line or in following any irregular or curved path, and to assure that the cutting edge of the glass cutter remains perpendicular to the glass when cutting either flat or curved glass.

Glass is cut by etching or scoring the glass along the desired line of cut and subsequently causing a mechanical or thermal shock within the glass to cause fracture at the score line. To accomplish clean fracture of the glass, the score line must be made evenly and with uniform pressure. The glass cutter must be advanced across the glass surface in a smooth continuous motion with the glass cutter maintained perpendicular to the glass surface.

Conventional glass cutters comprising a handle in which are mounted rotatable, hardened steel cutting wheels are difficult to maintain in the proper position perpendicular to the glass surface and to advance along a desired path due to the instability inherent with a one-point contact. The operator's hand tends to be unsteady particularly when a large workpiece requires significant arm extension in operation. When the glass to be cut is curved, the operator encounters the further difficulty of maintaining the glass cutter perpendicular to the glass due to the constantly changing angle of the curved surface.

Various efforts have been made to advance the state of the art by providing supports and guides; however, the advancements have not been completely successful, especially when scoring a line on a curved surface is required.

SUMMARY OF THE INVENTION

Accordingly, it is a general object of this invention to provide a novel and improved hand-held glass cutter operable for scoring a cutting line on flat or curved glass or the like.

Another object of this invention is to provide a hand-held glass cutter which is specifically adapted to maintain the cutting wheel in the proper position perpendicular to the glass surface and which will obviate the undesirable force imbalances of prior art devices that tend to prevent smooth continuous tracking along a desired path when flat or curved glass is being cut.

A further object of this invention is to provide a novel hand-held glass cutter which will permit smooth tracking along a straight or curved edge to accomplish a clean, straight score line or a curved score line in flat or curved glass.

In accordance with the present invention in a preferred embodiment thereof there is provided a hand-held glass cutter with a novel three-point work surface contact. One point on the three-point contact is defined by the lower cutting edge on the circumference of a cutting wheel and the other two points are defined by the rearward wing portions of the frame member. The latter two points on the wing portions lie on a line perpendicular to the plane of the cutting wheel and straddle the line scored by the cutting wheel when the glass cutter is advanced along a straight line path. Regardless of whether the cutter is operated to score a straight or curved line on flat or curved glass, the rear wing portions of the glass support will maintain the cutting wheel in perpendicular relation to the glass surface as the cut line is scored. Further, the position of the wing portions on a line perpendicular to the plane of the cutting wheel and trailing the cutting wheel, together with the index finger position, pointing in the direction of movement of the cutter, obviates undesirable force imbalances and erratic divergences, so that the cutter can be advanced in a smooth continuous manner along the desired path. In addition, an extended front edge is provided which acts in cooperation with the rear wing portion on the same side to guide the cutter in advancing along a straight edge or template to score a line of the desired pattern.

BRIEF DESCRIPTION OF THE DRAWINGS

Other objects, advantages and capabilities of the present invention will become more apparent as the description proceeds, taken in conjunction with the accompanying drawings, in which.

DETAILED DESCRIPTION OF THE PREFERRED EMBODIMENTS

Figure 1:
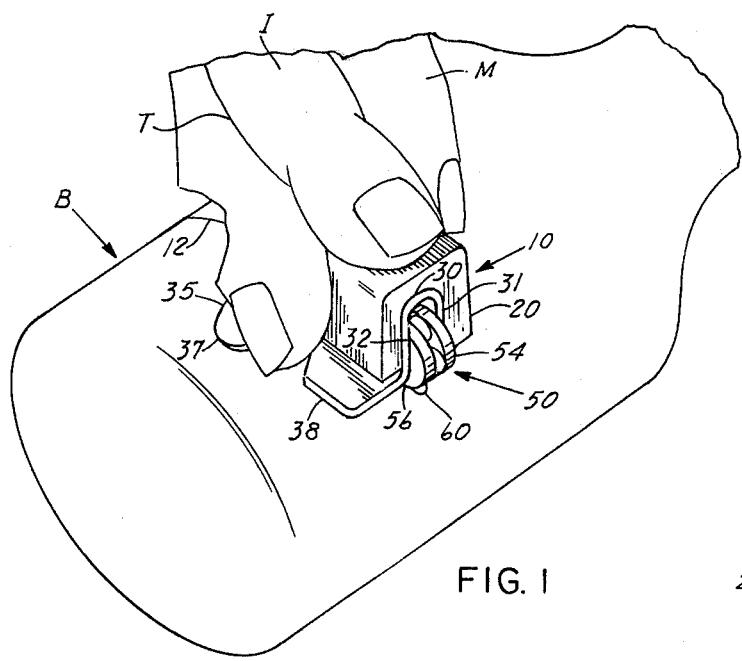
FIG. 1 is a perspective view of the preferred form of hand-held glass cutter of the present invention, shown as it would be grasped to score a straight, curved or irregular line, in this instance, upon the curved surface of a glass bottle.

A hand-held glass cutter 10 formed in accordance with the present invention is shown in FIG. 1 being used to score a cutting line 12 on the curved surface of glass bottle B. Of course, the same glass cutter 10 can be used to score a cut line on glass having a flat surface, and it is particularly suitable for scoring a cut line on the glass surface of a bottle parallel to the bottle's longitudinal axis.

Figure 2:
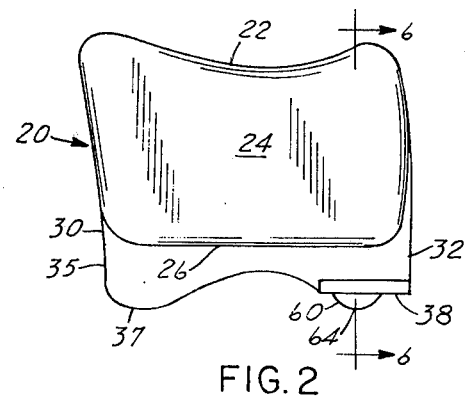
FIG. 2 is a side elevational view of the apparatus shown in FIG. 1.
Figure 3:
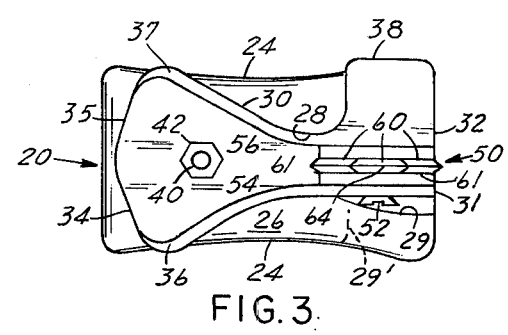
FIG. 3 is a bottom plan view of the apparatus.

The glass cutter 10 includes a housing or body 20, a frame member 30 mounted in the housing 20, and a cutter wheel assembly 50 mounted in the frame member 30. The housing 20 is of a generally saddle-shaped configuration formed of a suitable relatively hard material, such as, wood or plastic. Appropriately shaped depressions in the top at 22 and the sides at 24, as best seen in FIGS. 2 and 3, enable the user to grip the housing 20 between his thumb T and middle finger M on the sides while pressing down on the top with his index finger I, as shown in FIG. 1, for conveniently holding and manipulating the glass cutter 10. The housing 20 also has a recessed groove 28 in its bottom 26 sized and shaped to receive the frame member 30.

Figure 5:
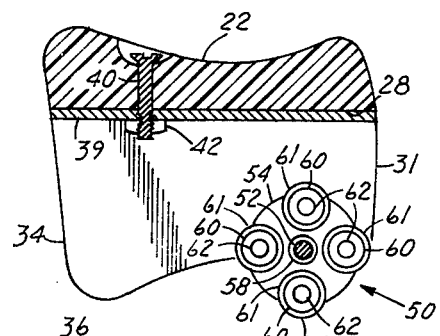
FIG. 5 is a sectional view taken along lines 5—5 of FIG. 4.

The frame member 30, as best seen in FIGS. 1, 3 and 5, is formed of a piece of metal bent into a generally inverted U-shaped cross-section. The forward lower open ends of frame member 30 protrude downward to form mounting brackets 31 and 32 for the cutter wheel assembly 50. The rearward end of the mounting bracket 30 is extended and flared downwardly and outwardly to form supporting wing portions 34 and 35. The lowest extremities 36 and 37 of the supporting wing portions 34 and 35, respectively, define two of the three points of contact which the glass cutter 10 makes with the glass surface during use. A guide edge 38 is defined by a lateral extension of one of the brackets 32 for use in guiding the glass cutter 10 along a straight edge or template of desired pattern. The frame member 30 is releasably secured in the groove 28 of housing 20 by bolt 40 and nut 42, the bolt 42 extending through the upper portion 39 of frame member 30 and through the top 22 of housing 20. In the alternative, frame member 30 could be permanently attached to housing 20 by gluing or other suitable means.

Figure 6:
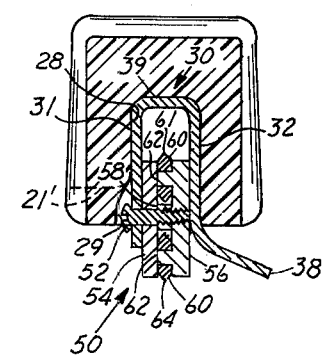
FIG. 6 is a sectional view taken along lines 6—6 of FIG. 2.

A common wheel assembly 50 is mounted in the frame member 30 between brackets 31 and 32 on a central shaft defined by screw 52, as best seen in FIGS. 1, 3, 4, 5 and 6. The cutter wheel assembly 50 is defined generally by a turret comprising two circular plates 54 and 56 mounted in axially spaced relation on central shaft 52 including a plurality of individual scoring wheels 60, with sharpened cutting edges 61 about their peripheries, selectively rotatable into use position at the bottom of the turret. The scoring wheels 60 are rotatably mounted on respective axles 62 permanently affixed in circumferentially spaced relation on one of the circular plates 56. Circular plate 56 also has an internally threaded sleeve portion 58 protruding concentric to its axis from the same side and of the same length as axles 62. As best seen in FIG. 6, the screw 52 is slidably inserted through bracket 31 and through circular plate 54 and is threadedly received in sleeve portion 58 and circular plate 56. As screw 52 is screwed into the plate 56 and tightened, axles 62 and sleeve portion 58 are drawn into abutting relationship with plate 54, and plate 54 is drawn into immovable abutting relationship with bracket 31. The axles 62 and sleeve portion 58 maintain the space between plates 54 and 56 just wide enough to allow each scoring wheel 60 to be freely rotatable about its respective axle 62.

The turret is disposed in the described tightened position with one of the scoring wheels 60 at the lowest extremity of the cutter wheel assembly 50. This lowest scoring wheel 60 is in operable position to score a line 12 on a glass surface for cutting in the manner well-known in the art. The cutting edge 61 on the lowest scoring wheel 60 is the scoring instrumentality and the lowest extremity of that cutting edge 61 also defines the third point of contact 64 which the glass cutter 10 makes with the glass surface during use. This three-point contact defined by points 36, 37 and 64 all cooperating with one another is a significant stabilizing feature of this invention during operation as will be more fully described hereinafter. The remainder of the scoring wheels 60 are disposed about the circumference of the cutter wheel assembly 50 in inoperable storage position.

Figure 4:
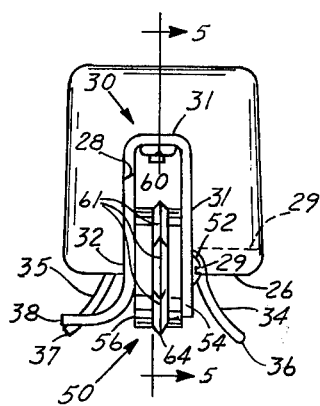
FIG. 4 is an end elevational view of the apparatus.

When the cutting edge 61 on the lowest scoring wheel 60 becomes dulled through use, a different scoring wheel 60 can be rotated from storage position into use position at the lowest extremity of the wheel assembly by simply loosening screw 52, rotating the turret about the axis defined by the screw on central shaft 52 until a different scoring wheel 60 is in the desired operable position, then retightening screw 52 to secure the turret against further rotation. When all of the scoring wheels 60 have been dulled from use, they can be replaced with a new set of scoring wheels by completely removing screw 52, sliding cutter wheel assembly 50 out from between brackets 31 and 32, separating circular plates 54 and 56, sliding the old scoring wheels 60 off axles 62, sliding new scoring wheels on axles 62, and reassembling and reinstalling the cutter wheel assembly 50 into brackets 31 and 32 by reversing the above-described procedure. It should also be noted that notch 29 is provided in housing 20 to accommodate the head of screw 52. Since this notch may not be large enough to allow a conventional screwdriver to engage with the head of screw 52, it is necessary to remove frame member 30 from the groove 28 in housing 20 prior to changing the operating scoring wheel 60 or replacing the scoring wheels 60 with new scoring wheels. Removal of frame member 30 is accomplished by simply removing nut 42 from bolt 40 and sliding frame member 30 out of groove 28. In the alternative where frame member 30 is permanently secured in groove 28 by gluing or the like, it may be necessary to provide an enlarged notch 29 as indicated in FIGS. 3, 4 and 6 by phantom lines 29' for convenient access to screw 52 with a conventional screwdriver.

It is also noted that while the above description of the cutting wheel assembly 50 is quite detailed to assist understanding of the structure of the present invention, a number of commercially available variations of the wheel cutting assembly can be successfully used without departing from the novelty of the invention.

As described above, the glass cutter 10 is operated by grasping the housing 20 between the user's thumb T and middle finger M and pressing down on the top with his index finger I pointed in the direction of the line 12 is to be scored. In such manner, the glass cutter 10 is placed on the glass surface to be cut with the three points 36, 37 and 64, defined by the lowest extremities of the supporting wing portions 34 and 35 and of the cutting edge 61 of the scoring wheel 60, respectively, in contact with the glass surface and oriented with the plane of the cutting wheel intersecting the glass surface congruent with the intended score line. A line 12 is scored by applying force on the glass cutter 10 normal to the surface of the glass whereby the cutting edge 61 of the scoring wheel 60 is pressed into the glass while the glass cutter is advanced in the desired direction of the intended score line.

By holding all three of the points 36, 37 and 64 in contact with the glass surface at all times during the scoring operation, the scoring wheel 60 is supported perpendicular to the glass surface and the user's ability to maintain a desirably uniform pressure on the glass cutter 10 throughout the scoring operation is enhanced, thereby resulting in a more accurate and more effective score line for cutting the glass. The arrangement of the three-point contact of this invention permits achievement of this result, not only when scoring a line on a glass with a flat surface, but also when scoring a line on the curved surface of a glass bottle B both perpendicular and parallel to the longitudinal axis of the bottle. More particularly, the active point 64 is located on the point of contact between the cutting edge 61 and the glass surface, and the passive points 36 and 37 are located on a line which is perpendicular to a plane extending from the scoring wheel 60 and which is spaced from the active point 64, and each of the passive points 36 and 37 respectively being spaced an equal distance on opposite sides of the plane extending from the scoring wheel 60. More graphically described, the supporting wings 34 and 35 straddle the line 12 scored by the scoring wheel 60 as the glass cutter 10 is forwardly advanced over the surface of the glass with each passive point 36 and 37 respectively spaced an equal distance on opposite sides of the scored line.

Figure 7:
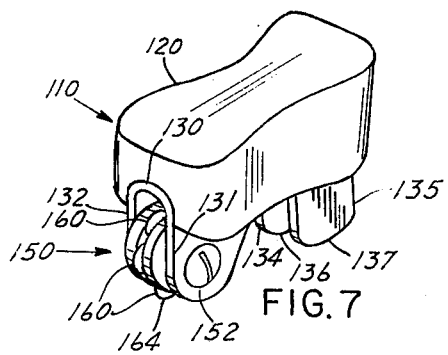
FIGS. 7 and 8 are perspective views of two alternate embodiments of the hand-held glass cutter of the present invention.

An alternate embodiment of the glass cutter 110 shown in FIG. 7 discloses a housing 120 which is less encompassing in receiving frame member 130, and the frame member 130 is modified so that the supporting wing portions 134 and 135 extend downwardly but they are not flared outwardly. There is no guide edge provided extending from brackets 131 or 132. This alternate embodiment still provides similarly oriented points 136, 137 and 164, but it is more compact and convenient for use on small workpieces, in confined areas, or where a score line with numerous curves are desired. The housing 120 also permits ready access to central shaft screw 152 with a conventional screwdriver without the necessity of removing the frame member 130 from the housing 120. The cutter wheel assembly 150 shown in FIG. 7 is capable of holding six scoring wheels 160.

Figure 8:
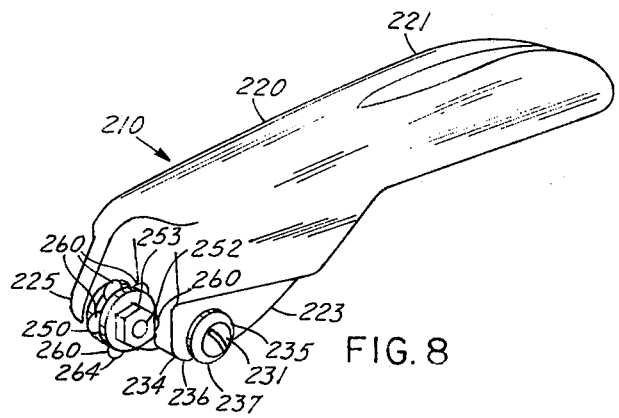

Another alternate embodiment of the glass cutter 210 is shown in FIG. 8 wherein the housing 220 is enlarged to include an elongated handle portion 221 which extends into the palm of the user's hand. The housing 220 also serves as the frame on which the supporting wings 234 and 235 and the cutter wheel assembly 250 are directly mounted. The supporting wings 234 and 235 are defined by washers attached to a downward extension 223 of the housing 220 with a bolt 231. The cutter wheel assembly 250 is removably attached to a forward extension 225 of housing 220 with a central shaft screw 252 and threaded nut 253. The lowest extremities of the supporting wings 234 and 235 respectively define the passive points 236 and 237 and the lowest extremity of the scoring wheel 260 defines the active point 264 of the three-point contact of this invention. This larger embodiment is easier to grasp and is convenient for use on larger workpieces and in relatively unconfined areas, and it is more convenient for use by persons with more limited manual dexterity. The larger handle 221 also enables even a skilled operator to use the glass cutter 210 for extended periods of time without tendency to tire.

Although the present invention has been described with a certain degree of particularity, it is understood that the present disclosure has been made by way of example and that changes in details of structure or in manner of operation may be made without departing from the spirit thereof.

I claim:

1. A hand-held glass cutter for scoring flat and curved surfaces comprising:
    a housing, including finger gripping surfaces thereon and a cutter wheel support generally disposed at the bottom of said housing substantially along a central axis thereof and provided with a front portion and a rear portion;
    a cutter wheel assembly including at least one rotatably journaled cutter wheel disposed at the front portion of said cutter wheel support, said cutter wheel having a sharpened cutting edge around its peripheral surface; and
    spaced support means extending downwardly from the rear portion of said cutter wheel support on opposite sides of the central axis defining laterally spaced points of support rearwardly of said cutter wheel.

2. A glass cutter according to claim 1, said cutter wheel support being defined by an inverted, generally U-shaped body with side portions extending downwardly in spaced, side-by-side relation, said cutter wheel assembly being interposed between said side portions.

3. A glass cutter according to claim 2, passive support means being defined by respective downwardly and opposite outwardly directed extensions of said side portions whereby to provide a broad support base.

4. A glass cutter according to claim 2, said spaced support means being defined by respective straight downwardly directed extensions of said side portions.

5. A glass cutter according to claim 2, including guide means protruding outwardly from one of said side portions.

6. A glass cutter according to claim 1, said gripping surfaces comprising concave depressions in said housing body shaped to correspond with the profile of a user's fingers and thumb.

7. A glass cutter according to claim 1, said housing body including an elongated handle portion shaped to extend into the palm of a user's hand.

8. A glass cutter according to claim 1, said cutter wheel support being an integral portion of said housing body including at least one forward extension and at least one rearwardly disposed downward extension whereby said forward extension serves as a mounting bracket for said cutter wheel assembly and said downward extension serves as a mounting bracket for said spaced support means, and said spaced support means defined by circular plates attached to said downward extension.

9. Apparatus for cutting glass comprising:
    a housing body with concave depressions formed in its top and side surfaces;
    a frame section generally disposed at the bottom of said housing body, said frame section having a top portion and two separate side portions depending in spaced-apart side-by-side relation from said top portion;
    a cutter wheel assembly mounted near the front end of said frame section between said side portions, said cutter wheel assembly including a plurality of scoring wheels rotatably mounted on axles between two circular plates, said circular plates being rotatably mounted on a central shaft between said side portions, each scoring wheel having cutting means around its peripheral surface whereby said scoring wheels can be selectively rotated into position for cutting a score line on glass; and
    passive support means defined by respective downwardly directed extensions from the rear end of said side portions including two points of support at the bottom extremity of said passive support means located on a line perpendicular to the plane of said cutting wheel, each of said points respectively being spaced an equal distance on opposite sides of said plane.

* * * * *